(12) United States Patent
Stephens

(10) Patent No.: US 7,305,237 B2
(45) Date of Patent: Dec. 4, 2007

(54) HOLE-FILLING CHANNEL ACCESS

(75) Inventor: Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 10/740,958

(22) Filed: Dec. 17, 2003

(65) Prior Publication Data

US 2005/0136921 A1 Jun. 23, 2005

(51) Int. Cl.
*H04Q 7/20* (2006.01)
*H04L 12/50* (2006.01)

(52) U.S. Cl. .............. 455/434; 455/450; 455/41.2; 455/519; 370/364; 370/439

(58) Field of Classification Search ............... 455/450, 455/41.2, 519, 451, 452.1; 370/364, 439
See application file for complete search history.

(56) References Cited

U.S. PATENT DOCUMENTS

| 5,212,715 | A | * | 5/1993 | Pickert et al. | 375/366 |
|---|---|---|---|---|---|
| 5,987,012 | A | * | 11/1999 | Bruckert et al. | 370/331 |
| 6,404,756 | B1 | * | 6/2002 | Whitehill et al. | 370/338 |
| 6,987,982 | B2 | * | 1/2006 | Willenegger et al. | 455/515 |
| 7,177,644 | B2 | * | 2/2007 | Smith et al. | 455/445 |
| 7,187,930 | B2 | * | 3/2007 | Hunzinger | 455/437 |

| 2001/0005378 | A1 | | 6/2001 | Lee | |
|---|---|---|---|---|---|
| 2003/0087645 | A1 | * | 5/2003 | Kim et al. | 455/453 |
| 2003/0195005 | A1 | * | 10/2003 | Ebata | 455/445 |
| 2004/0203383 | A1 | * | 10/2004 | Kelton et al. | 455/41.2 |
| 2004/0264475 | A1 | * | 12/2004 | Kowalski | 370/395.5 |

FOREIGN PATENT DOCUMENTS

DE 4001832 7/1991

OTHER PUBLICATIONS

Nasipuri A et al : "Multichannel CSMA with signal power -based channel selection for multihop wireless network", Sep. 24, 2000, IEEE VTC 2000. 52nd Sep. 24-28, pp. 211-218.*
"International Search Report", PCT/US2004/039641, (Apr. 11, 2005), 17 pages.
Nasipuri, A. , et al., "Multichannel CSMA with signal power-based channel selection for multihop wireless networks", *Vehicular Technology Conference, IEEE VTS FALL VTC 2000*, vol. 1, (Sep. 24, 2000),211-218.
Okada, H. , et al., "Priority Schemes of Multi-Channel CSMA/CD for Advanced Multi-Media Networks", *Proceedings of the Global Telecommunications Conference and Exhibition, IEEE*, vol. 3, (Nov. 1987),p. 1607-1609.

* cited by examiner

*Primary Examiner*—Rafael Perez-Gutierrez
*Assistant Examiner*—Kwasi Karikari
(74) *Attorney, Agent, or Firm*—The Law Office of John C. Scott; John C. Scott

(57) ABSTRACT

Channel access techniques are provided for use in a high throughput wireless network that utilizes multiple wireless channels within a single service set.

27 Claims, 11 Drawing Sheets

HOLE-FILLING CHANNEL ACCESS

FIELD OF THE INVENTION

The invention relates generally to wireless communications and, more particularly, to channel access techniques and structures for use in a wireless network.

BACKGROUND OF THE INVENTION

High throughput (HT) wireless networking technologies have been proposed that will allow multiple wireless channels to be active within a single cell or basic service set (BSS) of a wireless network. Wireless devices (e.g., wireless client devices, wireless access points, etc.) within such a network may be able to communicate over any one of the active channels. In addition, it may be possible to team multiple channels to provide a higher overall data rate for a device. New HT-enabled devices would have to be used to take advantage of these channel teaming capabilities. It may also be desirable to allow single channel "legacy" devices to operate within such networks to provide, for example, backward compatibility. Methods and structures are needed for providing channel access in such networks.

DETAILED DESCRIPTION

Figure 1:
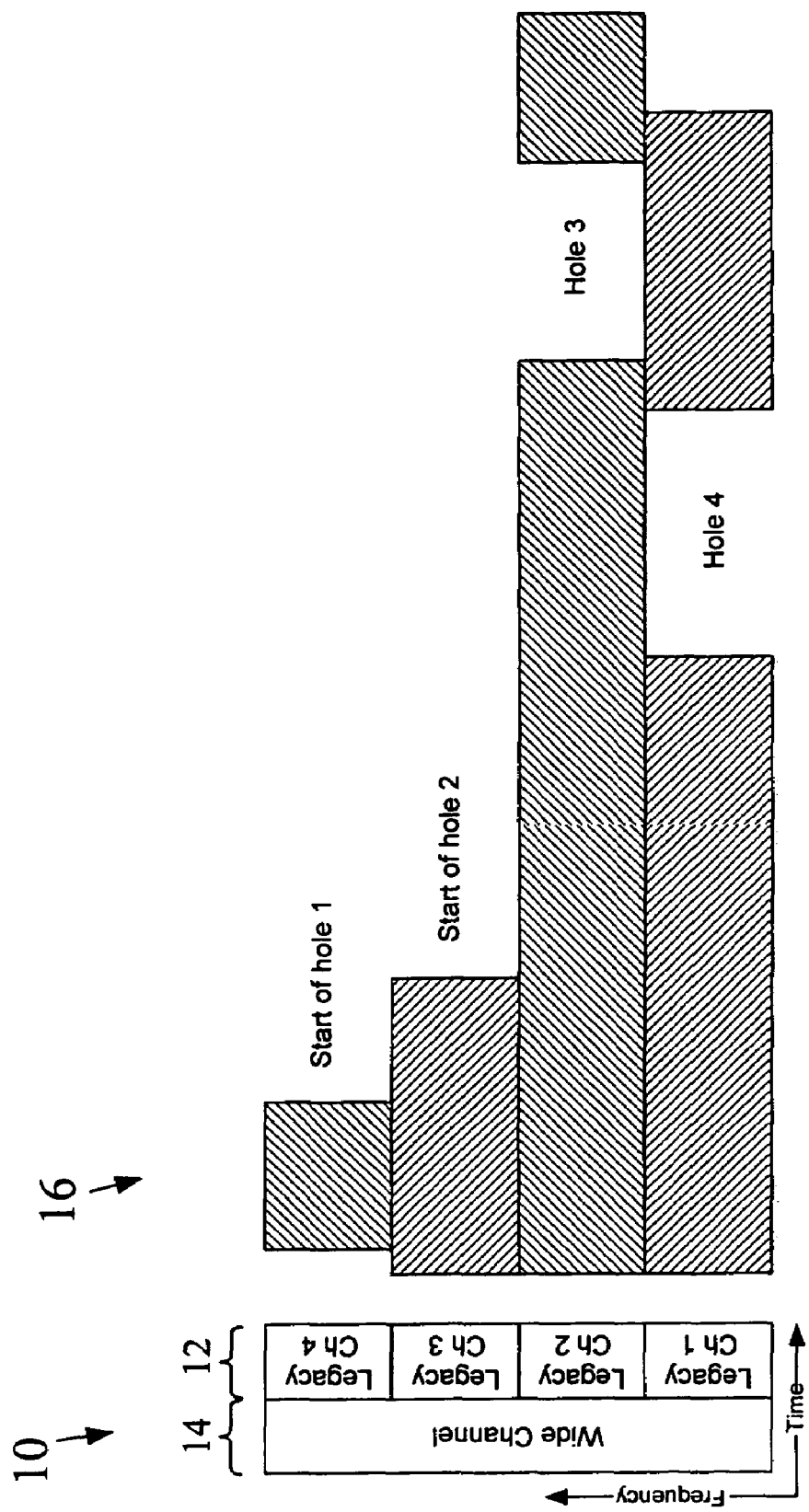
FIG. 1 is a diagram illustrating an example channel arrangement and channel usage scenario within a basic service set (BSS) of a high throughput wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example channel arrangement 10 and channel usage scenario 16 that may exist within a basic service set (BSS) of a high throughput (HT) wireless network. As illustrated, a number of individual frequency channels 12 (i.e., legacy channel 1, legacy channel 2, legacy channel 3, and legacy channel 4) are active within the BSS for use in supporting communication between, for example, a wireless access point (AP) and one or more wireless client devices (referred to as stations or STAs in the IEEE 802.11 wireless networking standard (ANSI/IEEE Std 802.11-1999 Edition and its progeny)). The frequency channels 12 are referred to as "legacy" channels in the illustrated embodiment because they may each correspond to a frequency channel defined for use within a single-channel legacy system (e.g., a system following the IEEE 802.11a wireless networking standard (IEEE Std 802.11a-1999), etc.). The frequency channels 12 collectively form a single "wide" channel 14 within the BSS. Although four frequency channels are shown in FIG. 1, it should be appreciated that any number of such channels (i.e., two or more) may be designated for use within a particular multi-channel BSS. A single-channel legacy device (e.g., a STA following the IEEE 802.11a wireless networking standard, etc.) within the BSS would be able to communicate on only one of the frequency channels 12 at a time. An HT-enabled device (client device or AP), on the other hand, may be capable of using the entire wide channel 14 to communicate at a higher data rate. An HT-enabled device may also be capable of communicating on a teamed channel that uses more than one, but less than all, of the individual channels 12. Thus, with reference to FIG. 1, an HT-enabled device may be capable of teaming, for example, legacy channel 1 and legacy channel 2 to achieve a higher data rate link within the BSS. Many other channel teaming scenarios may also be possible. HT-enabled devices may also be capable of single-channel operation.

FIG. 1 also illustrates a typical channel usage scenario 16 that may exist within a multi-channel BSS when single-channel devices are transmitting. The shaded portions within each channel indicate periods during which transmissions are active. As shown, a number of "holes" may be present in frequency and time that represent idle periods within the channels 12. To transmit data in the BSS, an HT-enabled device may have to gain access to one or more of the channels 12 given such a usage scenario. In a very simplistic approach, an HT-enabled device could simply wait for all of the legacy channels 12 to be idle and then transmit across the entire wide channel 14. However, a situation may never arise when all of the legacy channels 12 are free at the same time. Thus, HT-enabled devices within the BSS would be at a distinct disadvantage using such a simplistic channel access approach. In at least one aspect of the present invention, methods and structures are presented for providing channel access for HT-enabled devices within a multi-channel wireless network environment that attempts to make use of (or fill) the available "holes" in a channel usage pattern.

An HT-enabled device will typically be capable of demodulating packets from a single source at a time. A received packet may be received from any of the legacy channels 12 overlapping the wide channel 14 or from a combination of multiple legacy channels. An HT-enabled device may keep a busy timer (e.g., a network allocation vector or NAV in an IEEE 802.11 based network, etc.) for each of the associated legacy channels to identify periods of time when transmission onto that channel will not be initiated by the device. The HT-enabled device may also be capable of detecting energy within each of the legacy channels. A device may consider a legacy channel "busy" based on either the busy timer or a detection of energy within the channel. The HT receiver within an HT-enabled device will typically be in one of two states during normal operation; namely, busy and idle. When an HT receiver receives a packet, the receiver enters the busy state, marks the corresponding legacy channel(s) busy, and proceeds to read the packet header to determine whether the packet is wanted or not (e.g., whether the packet was intended for delivery to the HT-enabled device). If the packet is wanted, the HT receiver continues to receive the packet and remains in the busy state. If the packet is unwanted, the receiver sets the busy timer associated with the corresponding legacy channel (s) to expire at the known end of the packet (information indicative of the packet duration may be present within the packet header). The receiver then enters the idle state.

Figure 2:
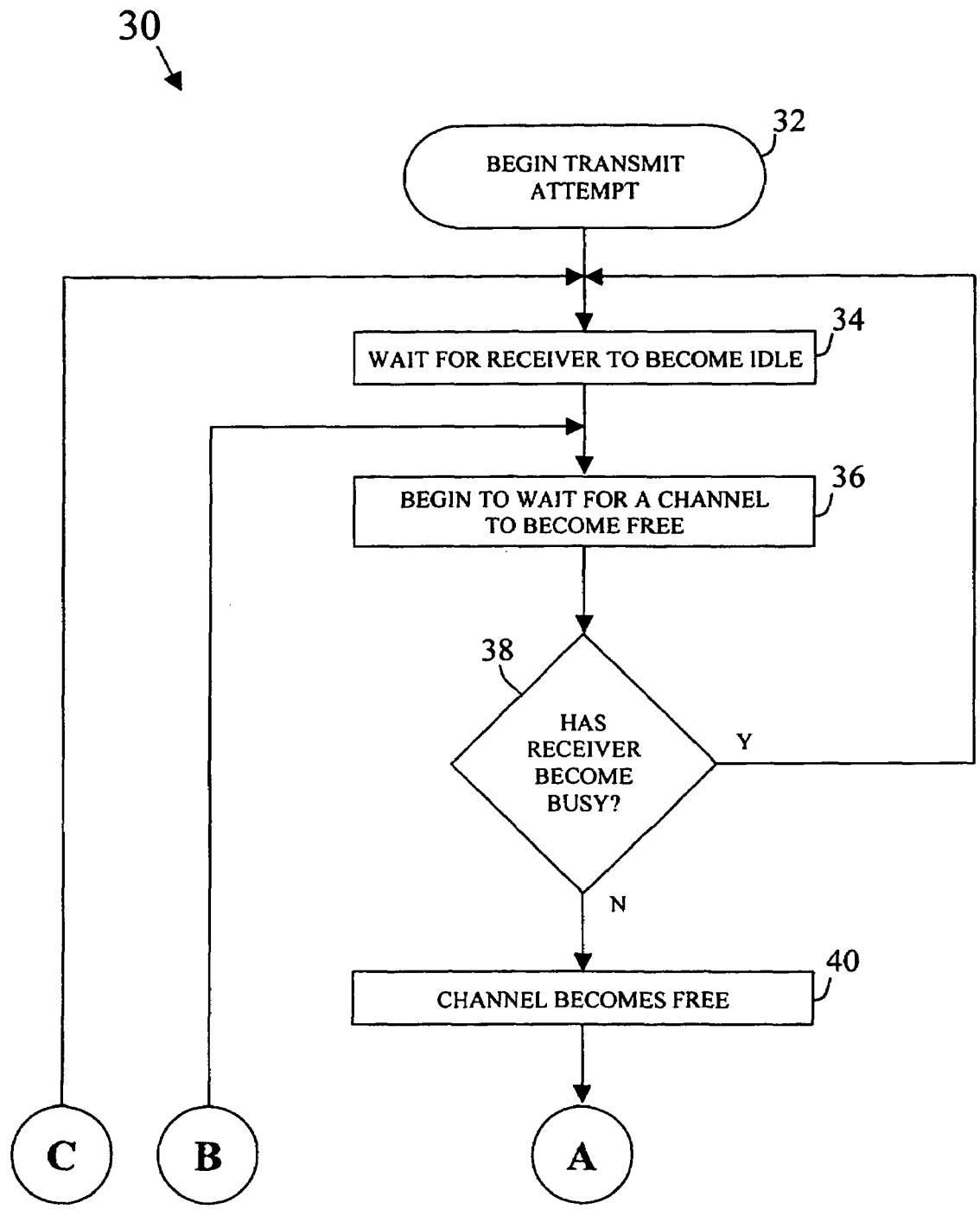
FIGS. 2 and 3 are portions of a flowchart illustrating a method for use in providing channel access for an HT-enabled device in a multi-channel network environment in accordance with an embodiment of the present invention.
Figure 3:
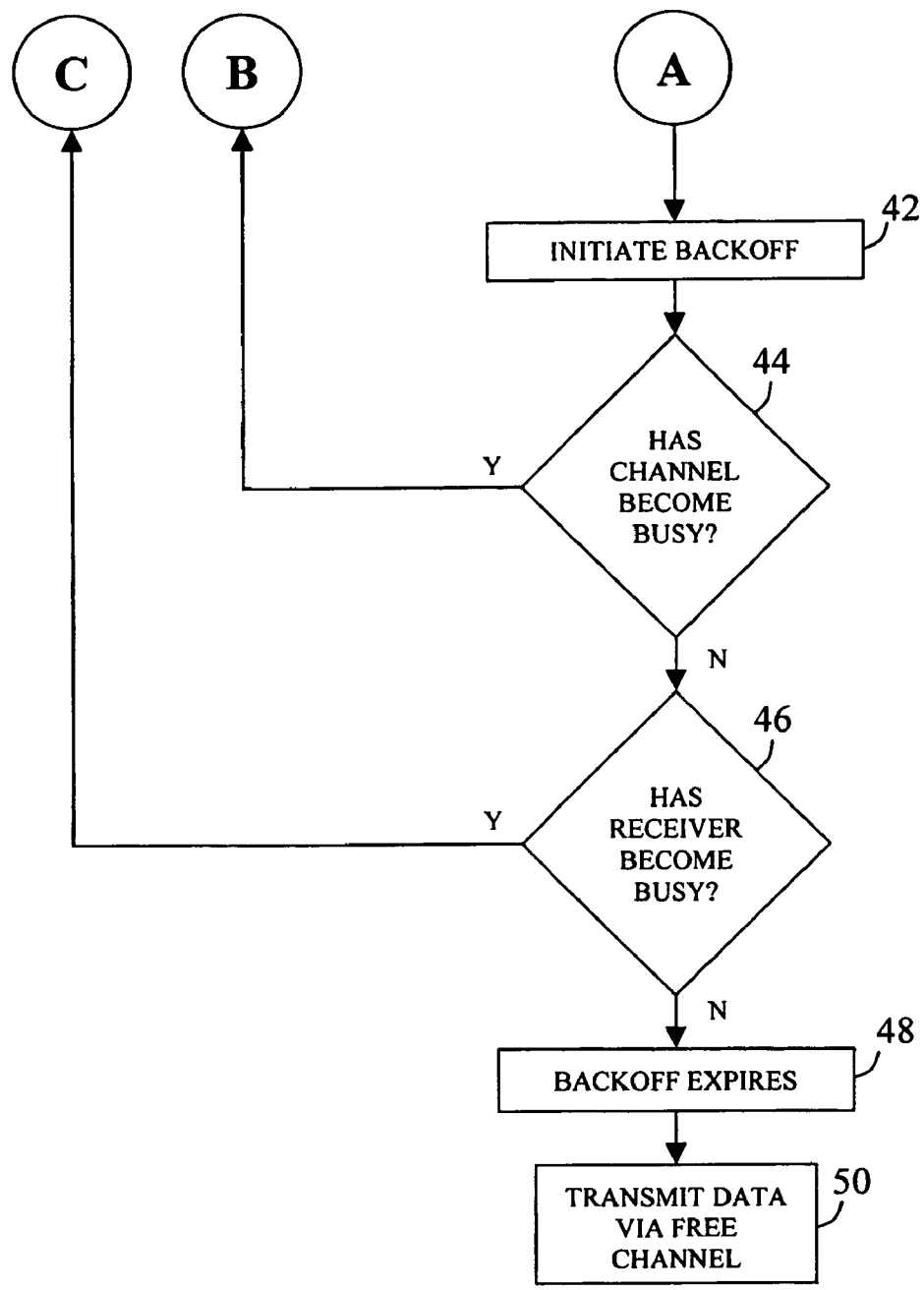

FIGS. 2 and 3 are portions of a flowchart illustrating a method 30 for use in providing channel access for an HT-enabled device in a multi-channel network environment in accordance with an embodiment of the present invention. The method assumes that a plurality of channels are available for use by an HT-enabled device seeking to transmit data. The method also assumes that the HT-enabled device is capable of transmitting on any of the available channels or on a teamed combination of channels. With reference to FIG. 2, an HT-enabled device first determines that data needs to be transmitted and initiates a transmit attempt (block 32). The device then waits for the corresponding receiver to become idle (block 34). When the receiver becomes idle, the device then begins to wait for at least one of the active channels to become free (block 36). While waiting for a channel to become free, the device may monitor the receiver to determine whether it has again become busy (block 38). If the receiver becomes busy during this time, the method 30 may return to block 34 and again wait for the receiver to become idle. One of the active channels will eventually become free before the receiver becomes busy (block 40). It is also possible that multiple channels may become free at the same time (e.g., at the end of a multi-channel packet, etc.).

With reference to FIG. 3, after one (or more) of the channels becomes free, a backoff period is initiated (block 42). The backoff period is an interval that the device will wait, after a channel becomes free, before transmitting data. The backoff period may be, for example, pseudo-randomly generated. It is desired that each device in a BSS that is waiting to transmit data will generate a different backoff interval so that collisions may be avoided after a channel becomes free. During the backoff period, the free channel may be monitored to determine whether it has again become busy (block 44). If the channel does become busy during this period, the method 30 may return to block 36 and again wait for a channel to become free. If multiple channels had originally become free, and only one of the multiple channels becomes busy during the backoff period, then the method 30 may continue without returning to block 36. Also during the backoff period, the receiver may be monitored to determine whether it has again become busy (block 46). If the receiver does become busy during this period, the method 30 may return to block 34 and wait for the receiver to become idle once again. If neither the channel nor the receiver becomes busy, the backoff period will eventually expire (block 48). The HT-enabled device may then transmit the data on the free channel (block 50). If multiple channels become free simultaneously in block 40 and remain free during the backoff period, then any one of the free channels, or a combination of two or more of the free channels, may be used to transmit the data.

Figure 4:
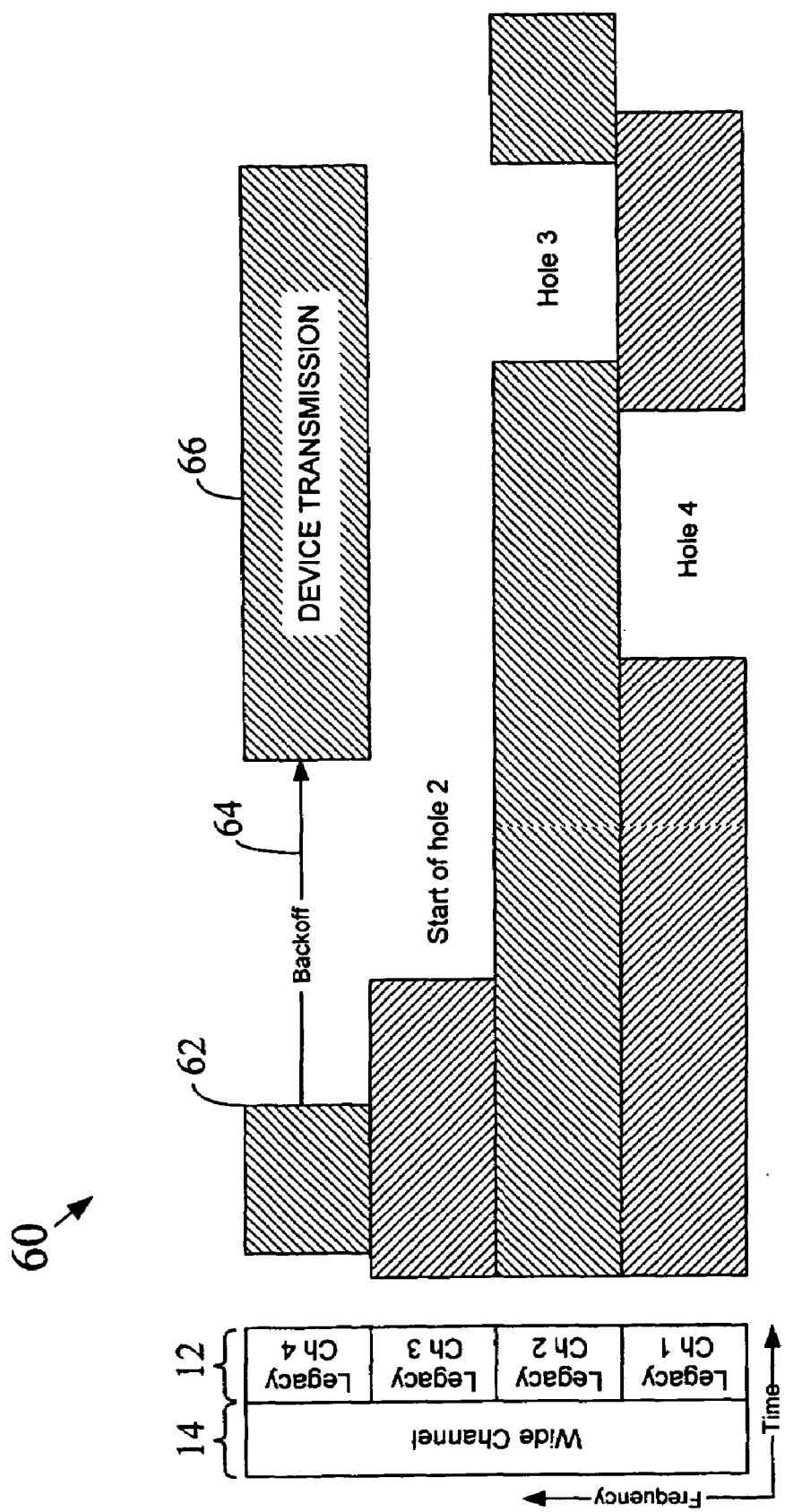
FIG. 4 is a diagram illustrating a channel usage scenario that exemplifies the operation of the method of FIGS. 2 and 3 in accordance with an embodiment of the present invention.

FIG. 4 is a diagram illustrating a channel usage scenario 60 that exemplifies the operation of the method 30 of FIGS. 2 and 3 in accordance with an embodiment of the present invention. As shown, legacy channel 4 becomes free at point 62 during a time when the receiver of an HT-enabled device is idle. A backoff period 64 is then initiated. The channel remains free and the receiver remains idle for the entire backoff period 64. The HT-enabled device then transmits a packet 66 within legacy channel 4.

Figure 5:
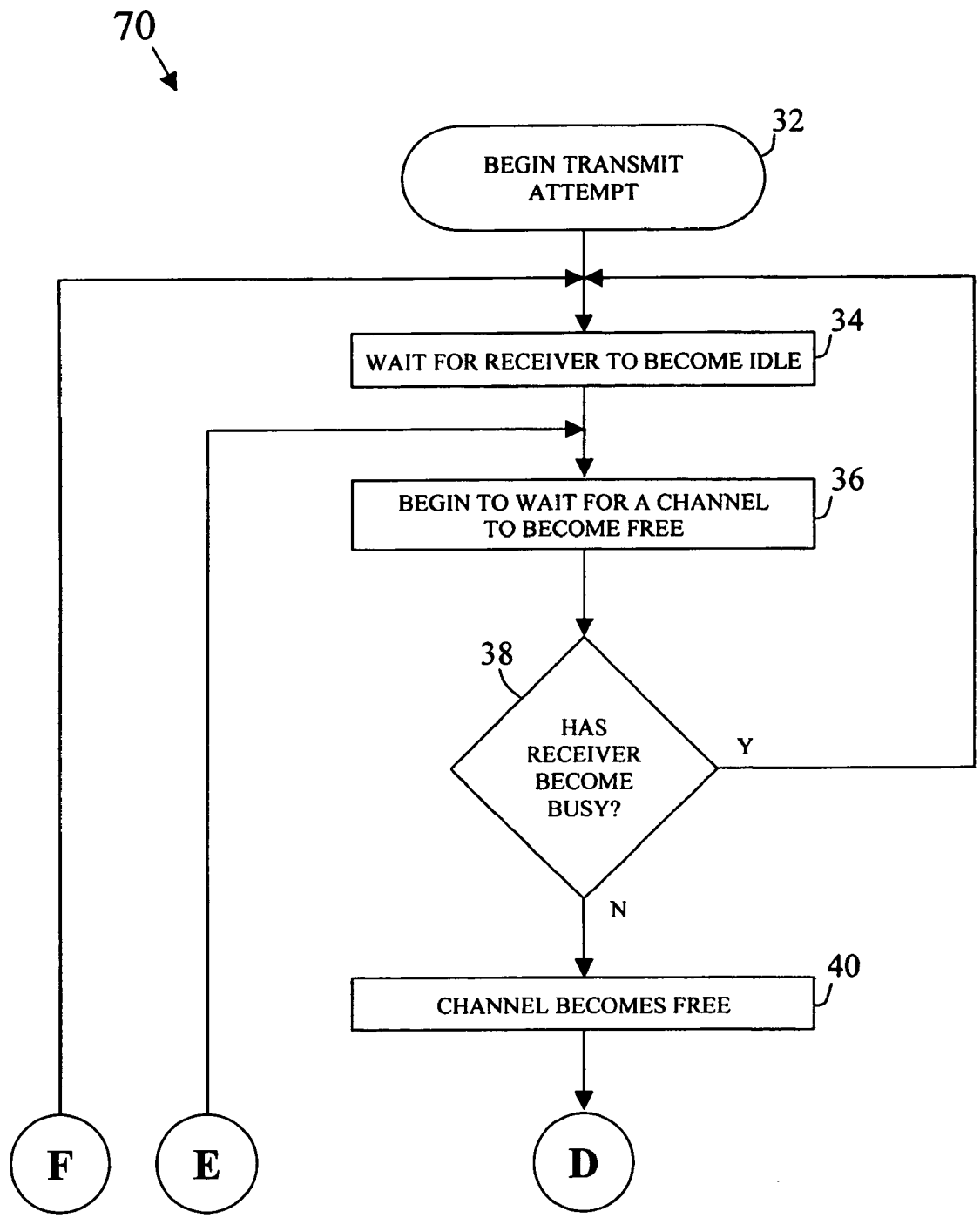
FIGS. 5 and 6 are portions of a flowchart illustrating a method for use in providing channel access for an HT-enabled device in a multi-channel network environment in accordance with another embodiment of the present invention.
Figure 6:
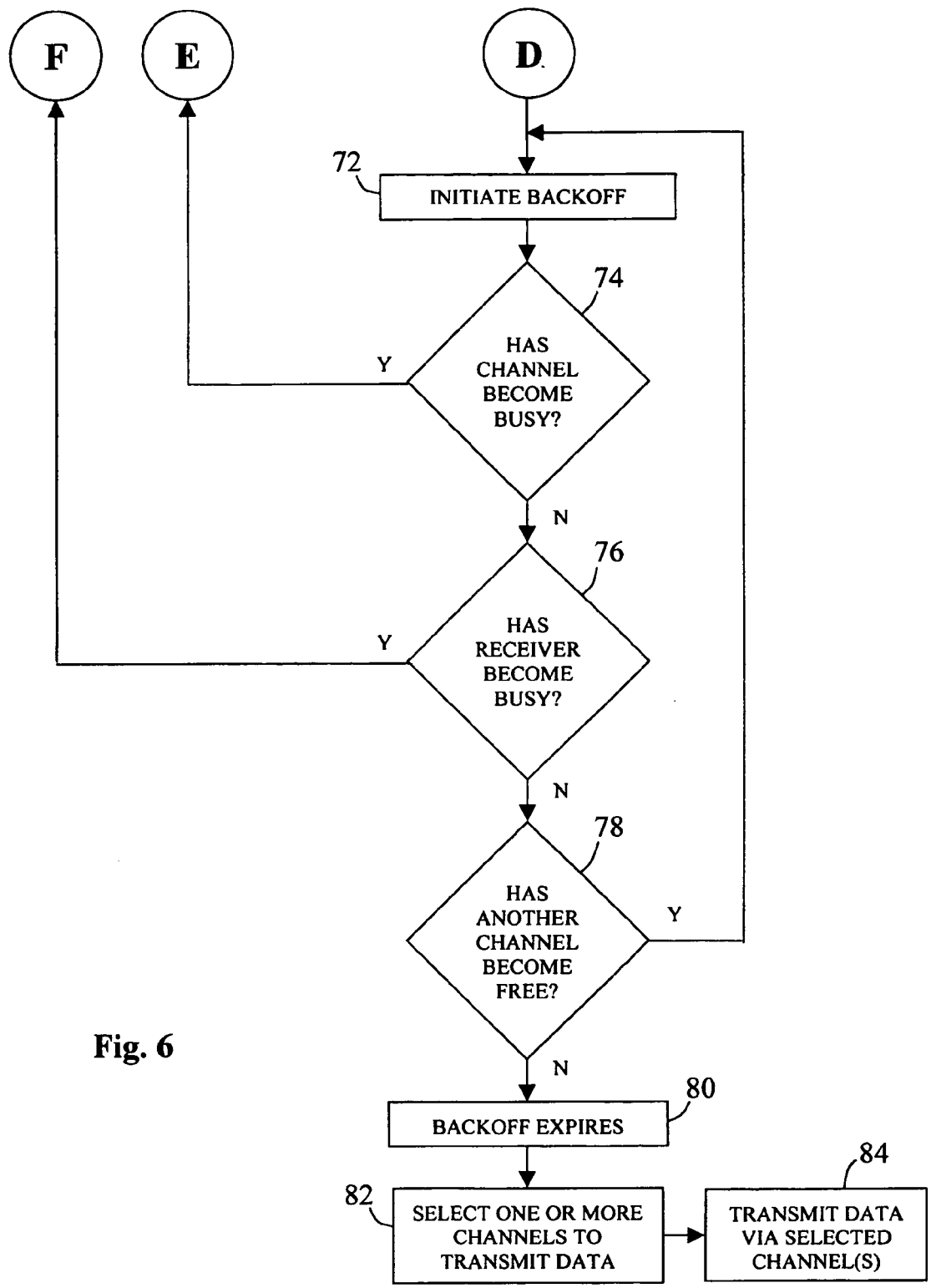

FIGS. 5 and 6 are portions of a flowchart illustrating a method 70 for use in providing channel access for an HT-enabled device in a multi-channel network environment in accordance with an embodiment of the present invention. The portion of the method 70 illustrated in FIG. 5 is substantially the same as the portion of previously described method 30 illustrated in FIG. 2 and thus will not be described further. Referring now to FIG. 6, after at least one of the channels becomes free, a backoff period is initiated (block 72). During the backoff period, the free channel(s) may be monitored to determine whether it has again become busy (block 74). As before, if the channel does become busy during the backoff period, the method 70 may return to block 36 (see FIG. 5) and again wait for a channel to become free. Also during the backoff period, the receiver may be monitored to determine whether it has again become busy (block 76). If the receiver becomes busy during this period, the method 70 may return to block 34 (see FIG. 5) and wait for the receiver to become idle once again. In addition, the other active channels may also be monitored during the backoff period to determine if one or more of them has become free (block 78). If so, the method 70 may return to block 72 and re-initiate the backoff period. The same backoff duration may be used from the previous initiation or a new backoff duration may be generated.

Eventually, the backoff period will expire (block 80). At this time, one or more channels may be selected from the free channels to transmit the data (block 82). Only free channels that have endured an entire backoff period will be considered. The data will then be transmitted via the selected channel(s) (block 84). In at least one implementation, an HT-enabled device may be programmed to always select the maximum number of free channels possible to transmit the data. In some cases, this may depend upon the capabilities of the device as well as the number of free channels identified. For example, if a device is only capable of transmitting using a maximum of two teamed channels, and three free channels have been identified, the device may only use two of the three free channels to transmit. Other techniques for selecting channels may alternatively be used.

The method 70 of FIGS. 5 and 6 may be modified to place a limit on the number of free channels that will be considered. For example, block 78 may only consider one additional free channel during execution of the method 70. If a third channel then becomes free during the backoff period, it may be ignored. Any number may be used as a limit in this manner. Other modifications are also possible.

Figure 7:
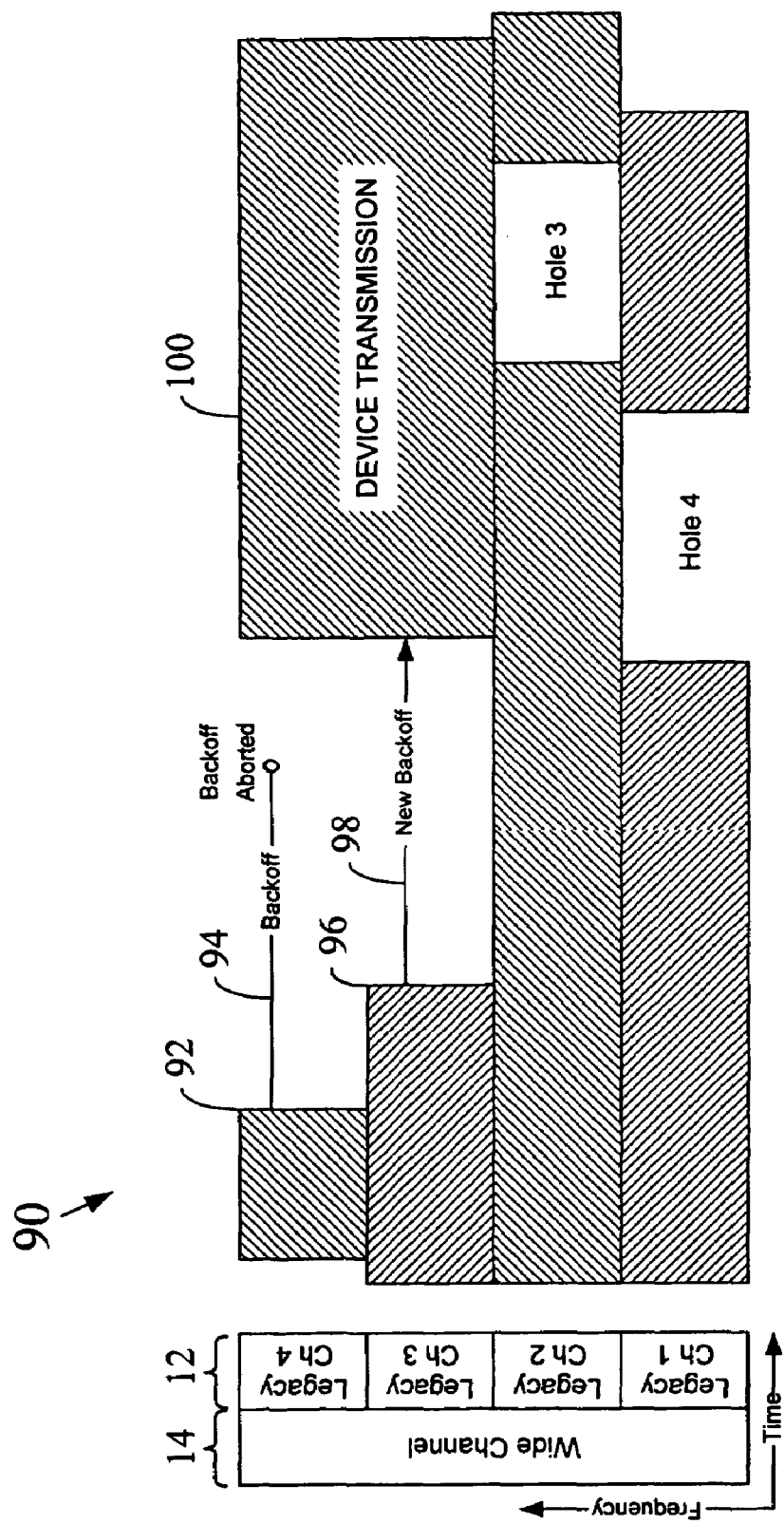
FIG. 7 is a diagram illustrating a channel usage scenario that exemplifies the operation of the method of FIGS. 5 and 6 in accordance with an embodiment of the present invention.

FIG. 7 is a diagram illustrating a channel usage scenario 90 that exemplifies the operation of the method 70 of FIGS. 5 and 6 in accordance with an embodiment of the present invention. As shown, legacy channel 4 becomes free at point 92 during a time when the receiver of an HT-enabled device is idle. A backoff period 94 is then initiated. Legacy channel 3 subsequently becomes free at point 96. A new backoff period 98 is then initiated and the original backoff 94 is aborted. The new backoff period 98 eventually expires while legacy channels 3 and 4 are still free and the HT receiver is still idle. The HT-enabled device then transmits a multi-channel packet 100 within legacy channels 3 and 4.

Figure 8:
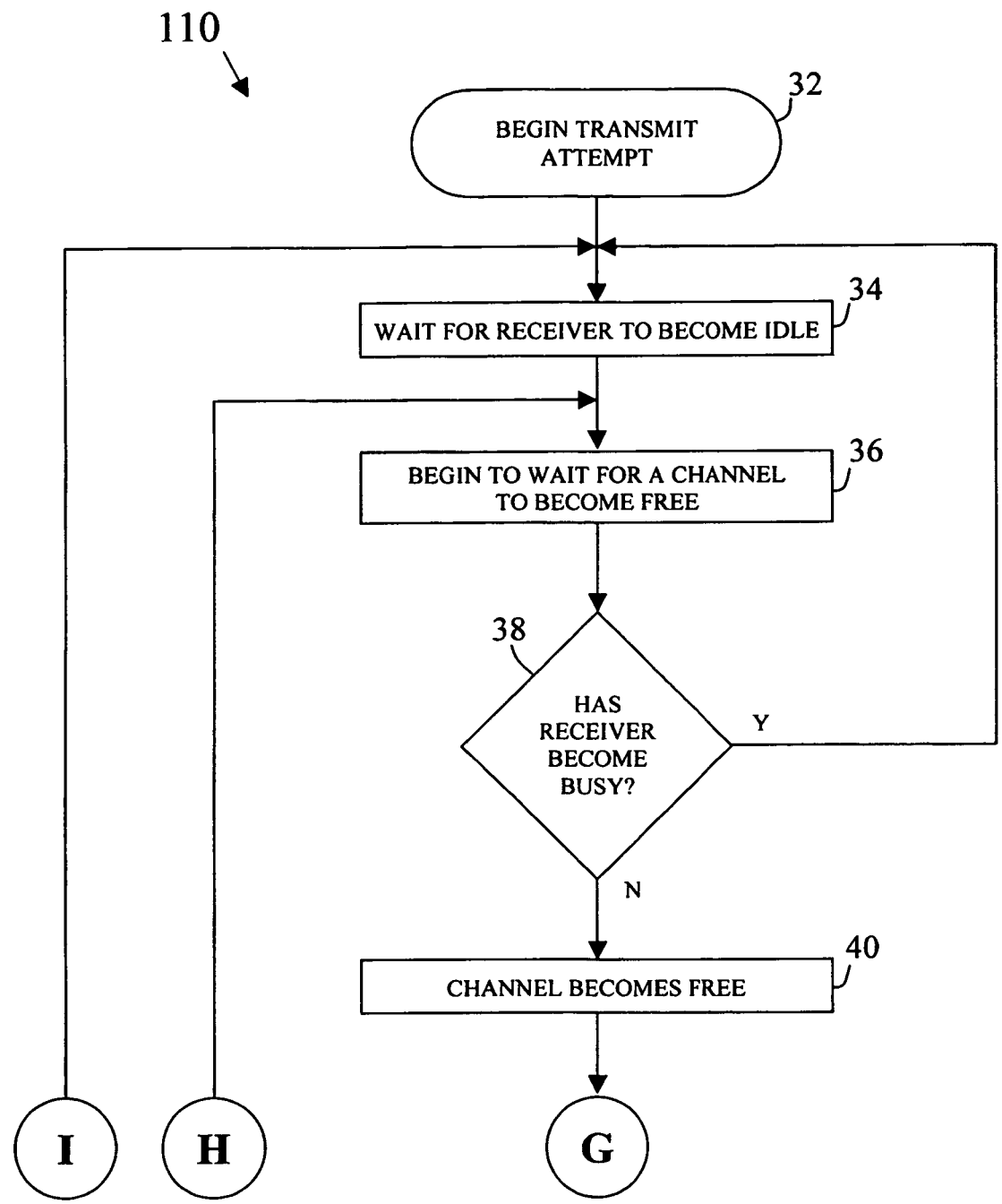
FIGS. 8 and 9 are portions of a flowchart illustrating a method for use in providing channel access for an HT-enabled device in a multi-channel network environment in accordance with yet another embodiment of the present invention.
Figure 9:
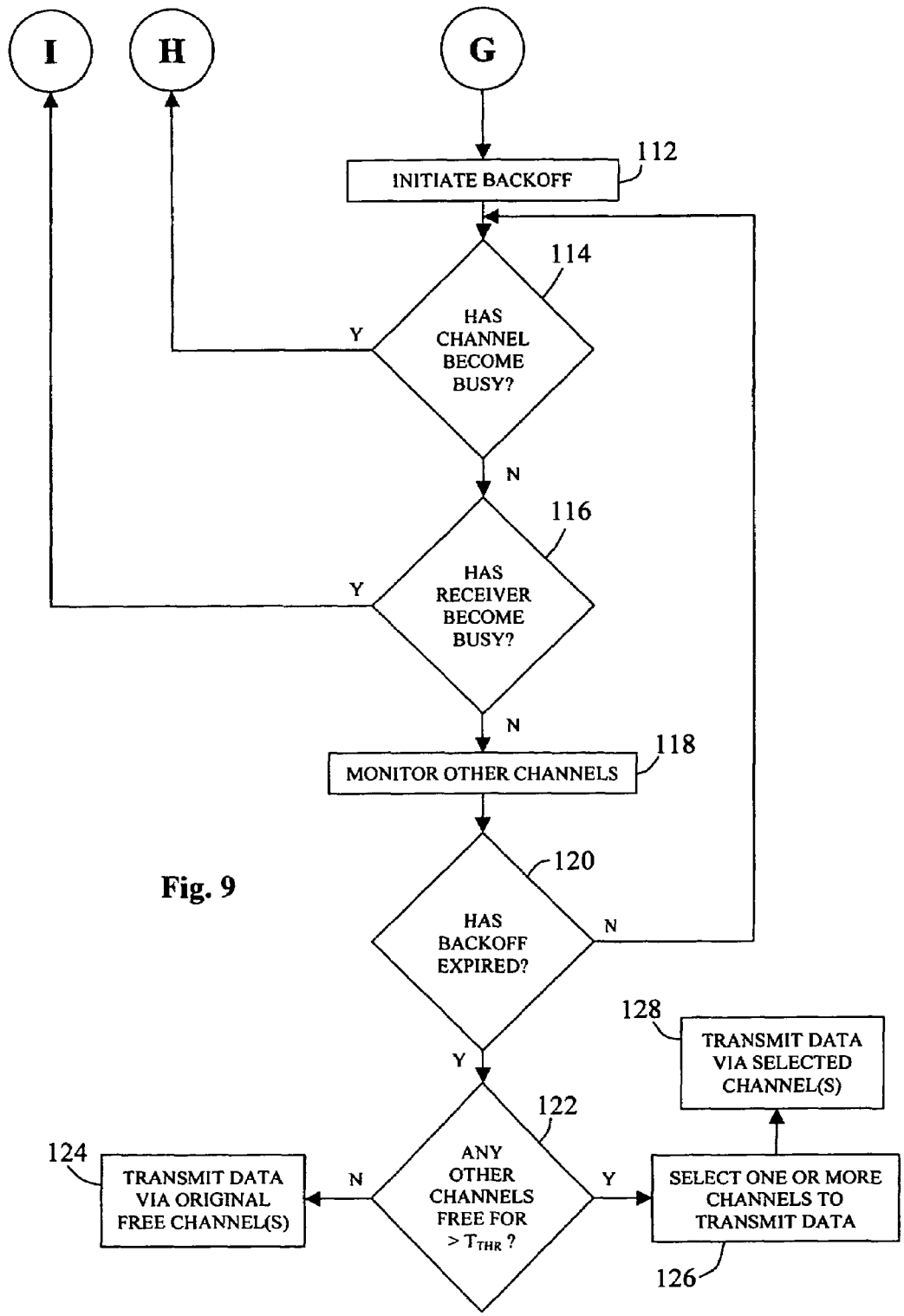

FIGS. 8 and 9 are portions of a flowchart illustrating a method 110 for use in providing channel access for an HT-enabled device in a multi-channel network environment in accordance with an embodiment of the present invention. The portion of the method 110 illustrated in FIG. 8 is substantially the same as the portion of previously described method 30 illustrated in FIG. 2 and thus will not be described further. Referring now to FIG. 9, after one or more of the active channels becomes free, a backoff period is initiated (block 112). During the backoff period, the free channel(s) may be monitored to determine whether it has again become busy (block 114). As before, if the channel does become busy during the backoff period, the method 110 may return to block 36 (see FIG. 8) and again wait for a channel to become free. Also during the backoff period, the receiver may be monitored to determine whether it has again become busy (block 116). If the receiver becomes busy during this period, the method 110 may return to block 34 (see FIG. 8) and wait for the receiver to become idle once again. In addition, the other active channels may also be monitored during the backoff period to determine if one or more of them has become free (block 118). If one or more of the other active channels becomes free during the backoff period, the time at which it became free may be recorded for later use.

Eventually, the backoff period will expire (block 120-Y). At this time, it may be determined (using, for example, the recorded time information) whether any of the other active channels had become free during the backoff period and have remained free for more than a threshold amount of time ($T_{THR}$) (block 122). If not, the data may be transmitted via the channel(s) that had originally become free (block 124). If so, then one or more channels may be selected for use in transmitting the data from a group that includes the channel(s) that were free at the start of the backoff and remained free throughout the backoff and the active channels that became free during the backoff period and remained free for more than $T_{THR}$ (block 126). The data is then transmitted via the selected channel(s) (block 128). As before, in at least one implementation, an HT-enabled device may be programmed to always select the maximum number of free channels possible to transmit the data. Other techniques for selecting channels may alternatively be used.

Figure 10:
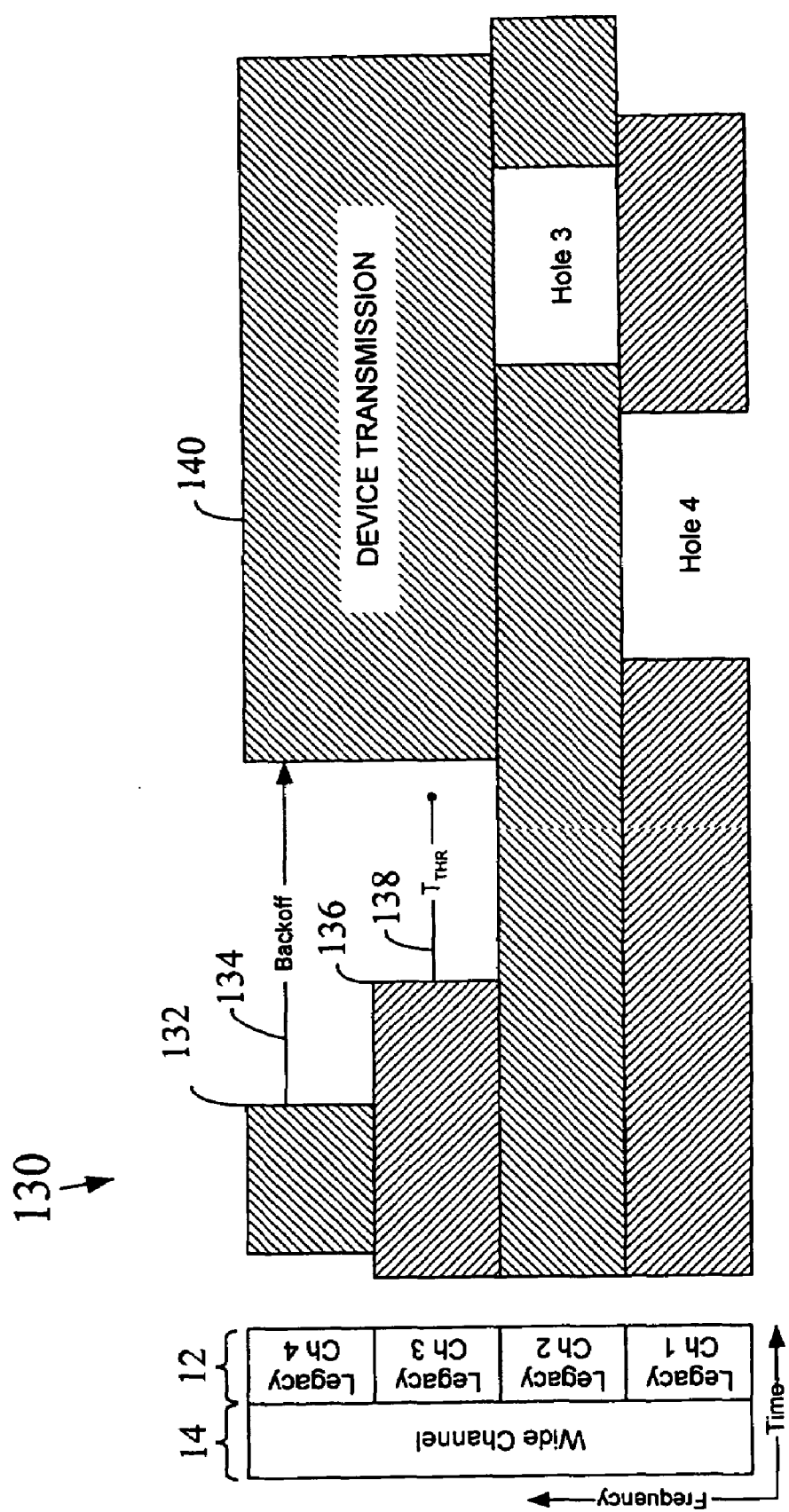
FIG. 10 is a diagram illustrating a channel usage scenario that exemplifies the operation of the method of FIGS. 8 and 9 in accordance with an embodiment of the present invention.

FIG. 10 is a diagram illustrating a channel usage scenario 130 that exemplifies the operation of the method 110 of FIGS. 8 and 9 in accordance with an embodiment of the present invention. As shown, legacy channel 4 becomes free at point 132 during a time when the receiver of an HT-enabled device is idle. A backoff period 134 is then initiated. Legacy channel 3 subsequently becomes free at point 136. The time that legacy channel 3 becomes free may be recorded. The backoff period 134 eventually expires while legacy channels 3 and 4 are still free and the HT receiver is still idle. In addition, legacy channel 3 has remained free for longer than a threshold amount of time ($T_{THR}$) 138 before the backoff period 134 expired. The HT-enabled device then transmits a multi-channel packet 140 within legacy channels 3 and 4.

Figure 11:
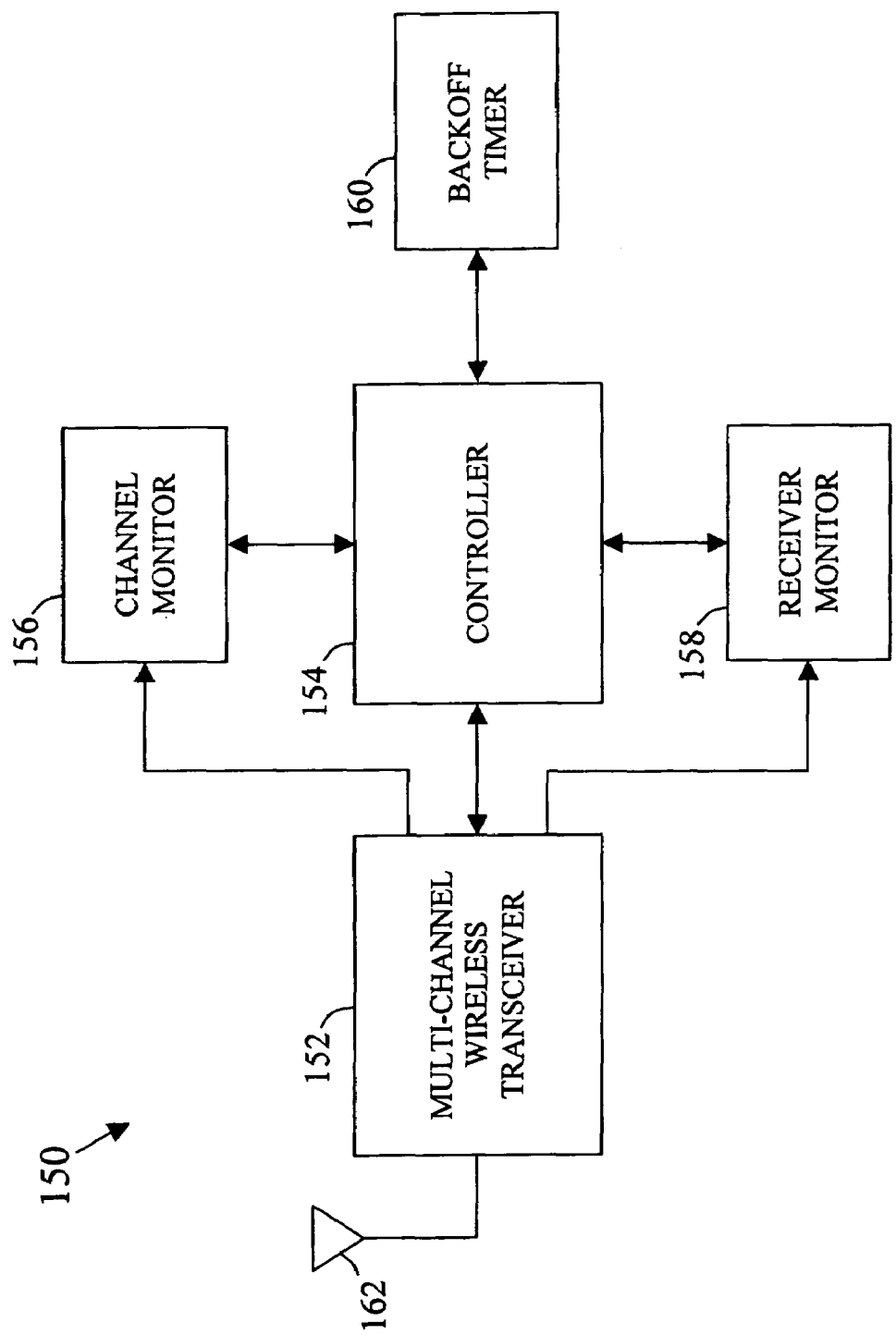
FIG. 11 is a block diagram illustrating an example wireless apparatus in accordance with an embodiment of the present invention.

FIG. 11 is a block diagram illustrating an example wireless apparatus 150 in accordance with an embodiment of the present invention. The wireless apparatus 150 may be part of, for example, a wireless client device, a wireless access point, or some other wireless structure for use in a wireless network. As illustrated, the wireless apparatus 150 may include one or more of: a multi-channel wireless transceiver 152, a controller 154, a channel monitor 156, a receiver monitor 158, and a backoff timer 160. The multi-channel wireless transceiver 152 may be capable of supporting wireless communication using one or more of a predetermined set of active channels. In at least one embodiment, the multi-channel wireless transceiver 152 is capable of communicating on multiple frequency channels associated with the IEEE 802.11a or 802.11g wireless networking standard, although other types of channels may alternatively be used. The multi-channel wireless transceiver 152 may include a single integrated transceiver or separate transmitter and receiver units.

The multi-channel wireless transceiver 152 may be coupled to an antenna 162 to facilitate the transmission and reception of wireless signals. Although only a single antenna 162 is shown, it should be appreciated that multi-antenna arrangements may alternatively be used, including arrangements that utilize separate transmit and receive antennas. Antenna diversity techniques may also be employed. The antenna 162 may include any type of antenna structure including, for example, a dipole antenna, a patch antenna, a helical antenna, an antenna array, and/or others, including combinations of the above.

The controller 154 may be operative for, among other things, gaining access to a wireless channel for the wireless apparatus 150 for use in communicating with a remote wireless entity. The controller 154 may make use of the channel monitor 156, the receiver monitor 158, and the backoff timer 160 as part of the channel access function. The channel monitor 156 monitors the active channels in a corresponding BSS to determine whether they are currently free or busy. As described above, in at least one embodiment, a channel may be considered busy if a corresponding channel timer has not yet expired or if energy (e.g., energy above some threshold level, etc.) has been detected within the channel. The receiver monitor 158 monitors the wireless receiver of the multi-channel wireless transceiver 152 to determine whether it is currently busy or idle. When the controller 154 determines that data needs to be transmitted, it will first wait for the receiver to become idle (e.g., using receiver monitor 158). When the receiver becomes idle, the controller 154 will then wait for at least one of the active channels to become free (e.g., using channel monitor 156). When a channel becomes free, the controller 154 may then determine a backoff value and start the backoff timer 160. When the backoff timer 160 expires, the controller 154 may cause the data to be transmitted by the multi-channel wireless transceiver 152 within the free channel(s).

While waiting for a channel to become free, the controller 154 may consult the receiver monitor 158 to determine whether the receiver is still idle. If the receiver becomes busy before a channel becomes free, the controller 154 may wait for the receiver to again become idle before proceeding. During the backoff period, the controller 154 may also consult the receiver monitor 158 to determine whether the receiver is still idle. If the receiver becomes busy during the backoff period, the controller 154 may also wait for the receiver to once again become idle before proceeding. The controller 154 may also consult the channel monitor 156 during the backoff period to determine whether the free channel(s) previously identified has since become busy. If so, the controller 154 may once again wait for a channel to become free. If the controller 154 identifies multiple free channels before the end of the backoff period, the controller 154 may select one or more of the free channels to be used for transmitting the data. A predetermined selection criterion may be defined. In at least one embodiment, a maximum number of free channels is used. Other selection criteria may alternatively be utilized. The controller 154 may be configured to perform, for example, the method 30 of FIGS. 2 and 3, the method 70 of FIGS. 5 and 6, the method 110 of FIGS. 8 and 9, and/or other channel access methods. The wireless apparatus 150 of FIG. 11 represents one possible device architecture in accordance with the present invention. Other architectures may alternatively be used.

It should be appreciated that the individual blocks illustrated in FIG. 11 may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above.

In the above-described embodiments, the invention has been described using, for the most part, terms that are commonly associated with the IEEE 802.11 wireless networking standard. It should be understood, however, that the inventive concepts are not limited to use within networks following the IEEE 802.11 standard. On the contrary, the inventive concepts may be used to provide channel access in any wireless network that uses multiple channels to service users within a coverage area. The inventive concepts are also not limited to use within infrastructure-type networks. That is, aspects of the invention may be implemented within peer-to-peer and ad-hoc networks.

In the embodiments described above, it has been assumed that the HT-enabled devices were capable of operating within a single channel. However, this may not always be the case. That is, some HT-enabled devices may be "pure" HT devices that are only designed for use across multiple channels (e.g., multiple legacy channels). If a "pure" HT device is attempting to gain access to a channel, the methods described above may have to be modified to allow a minimum number of free channels to be discovered before data transmission is permitted to occur. For example, in the method 110 of FIGS. 8 and 9, the end of the backoff period may have to be postponed until at least one additional legacy channel becomes free and remains free for the threshold period. Similarly, in the method 70 of FIGS. 5 and 6, the end of the backoff period may have to be postponed until at least one additional legacy channel becomes free and remains free for a new backoff period. Other modifications may alternatively be made. An HT-enabled access point will have to be capable of single channel operation if single channel legacy devices are to be supported within a corresponding BSS.

In the embodiments described above, the invention is described in the context of networks using multiple "frequency" channels within a single BSS. It should be appreciated that aspects of the present invention also have application within systems that utilize other types of channelization (e.g., code division multiple access (CDMA) based systems, time division multiple access (TDMA) based systems, hybrid systems, etc.).

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A channel access method for use in a multi-channel wireless network environment, comprising:
    when a receiver is idle, waiting for at least one channel within a plurality of frequency channels to become free;
    when at least one channel within said plurality of frequency channels becomes free, initiating a backoff period;
    monitoring said plurality of frequency channels during said backoff period to determine whether another channel has become free;
    when another channel becomes free during said backoff period, recording a corresponding time for subsequent use in determining whether channel teaming can be used; and
    transmitting data within one or more free channels after said backoff period expires, wherein transmitting data includes determining whether to transmit said data within multiple free frequency channels in a channel teaming arrangement when more than one free channel is available when said backoff period expires, wherein said channel teaming arrangement is an arrangement where data is communicated using multiple frequency channels to achieve a higher data rate link than can be achieved using a single frequency channel.

2. The method of claim 1, further comprising:
    monitoring said receiver while waiting for at least one channel within said plurality of frequency channels to become free to determine whether said receiver has become busy; and
    when said receiver has become busy, waiting for said receiver to again become idle.

3. The method of claim 1, further comprising:
    monitoring said at least one channel during said backoff period to determine whether said at least one channel has again become busy; and
    when said at least one channel becomes busy during said backoff period, terminating said backoff period and repeating waiting for at least one channel within said plurality of frequency channels to become free, wherein repeating waiting includes waiting for a next channel in said plurality of frequency channels to become free.

4. The method of claim 1, further comprising:
monitoring said receiver during said backoff period to determine whether said receiver has become busy; and
when said receiver becomes busy during said backoff period, terminating said backoff period and waiting for said receiver to again become idle.

5. The method of claim 1, wherein:
more than one free channel is available when said backoff period expires when said at least one channel has remained free until said backoff period expires and another channel had become free during said backoff period and has remained free for more than a threshold amount of time and until said backoff period expires.

6. The method of claim 1, wherein:
transmitting data within one or more free channels after said backoff period expires includes selecting one or more free channels for use in transmitting said data from a group of free channels after said backoff period has expired.

7. The method of claim 1, wherein:
transmitting data within one or more free channels after said backoff period expires includes transmitting said data using a maximum number of free frequency channels possible, wherein said maximum number of free channels can be greater than one.

8. The method of claim 1, wherein:
transmitting data within one or more free channels after said backoff period expires includes:
identifying whether any additional channels had become free during said backoff period and remained free for more than a threshold amount of time; and
when additional channels had become free during said backoff period and remained free for more than said threshold amount of time, selecting one or more free channels for use in transmitting the data from a group of free channels that includes said additional channels.

9. The method of claim 1, wherein:
transmitting data within one or more free channels after said backoff period expires includes transmitting said data within said at least one channel.

10. The method of claim 1, wherein:
said plurality of frequency channels includes a plurality of frequency channels that are active within a basic service set (BSS) of a wireless network.

11. A wireless apparatus, comprising:
a multi-channel wireless receiver;
a multi-channel wireless transmitter; and
a controller to control channel access to a wireless network medium, wherein said controller, when data is to be transmitted, first waits for said multi-channel wireless receiver to be idle, then waits for at least one channel within a plurality of active frequency channels to become free, then initiates a backoff period, then monitors said plurality of active frequency channels during said backoff period to determine whether any other channels have become free during said backoff period, then records a time value when another channel within said plurality of active frequency channels becomes free during said backoff period, said time value for subsequent use in determining whether channel teaming can be used, and then causes said data to be transmitted by the multi-channel wireless transmitter within one or more free frequency channels after the end of the backoff period, wherein said controller is to determine whether to transmit said data within multiple free frequency channels in a channel teaming arrangement when more than one free channel is available when said backoff period expires, wherein said channel teaming arrangement is an arrangement where data is communicated using multiple frequency channels to achieve a higher data rate link than can be achieved using a single frequency channel.

12. The wireless apparatus of claim 11, wherein:
said plurality of active frequency channels includes channels that are assigned for use within a corresponding basic service set (BSS).

13. The wireless apparatus of claim 11, further comprising:
a channel monitor to monitor said plurality of active frequency channels to determine a current status of individual channels therein.

14. The wireless apparatus of claim 11, further comprising:
a receiver monitor to monitor said multi-channel wireless receiver to track a status thereof.

15. The wireless apparatus of claim 11, further comprising:
a backoff timer to time said backoff period.

16. The wireless apparatus of claim 11, wherein:
said controller selects said one or more free channels for use in transmitting said data from a group that includes channels that became free during said backoff period and that remained free for at least a threshold amount of time.

17. The wireless apparatus of claim 11, wherein:
said controller selects a maximum number of free frequency channels for use in transmitting said data after the end of the backoff period, wherein said maximum number of free frequency channels can be greater than one.

18. An article comprising a storage medium having instructions stored thereon that, when executed by a computing platform, result in:
when a receiver becomes idle, waiting for at least one channel within a plurality of frequency channels to become free;
when at least one channel within said plurality of frequency channels becomes free, initiating a backoff period;
monitoring said plurality of frequency channels during said backoff period to determine whether another channel has become free;
when another channel becomes free during the backoff period, recording a corresponding time for subsequent use in determining whether channel teaming can be used; and
transmitting data within one or more free channels after said backoff period expires, wherein transmitting data includes determining whether to transmit said data within multiple free frequency channels in a channel teaming arrangement when more than one free channel is available when said backoff period expires, wherein said channel teaming arrangement is an arrangement where data is communicated using multiple frequency channels to achieve a higher data rate link than can be achieved using a single frequency channel.

19. The article of claim 18, further comprising:
monitoring said at least one channel during said backoff period to determine whether said at least one channel has again become busy; and when said at least one channel becomes busy during said backoff period, terminating said backoff period and repeating waiting for at least one channel within said plurality of frequency channels to become free, wherein repeating waiting includes waiting for a next channel in said plurality of frequency channels to become free.

20. The article of claim 18, further comprising:

monitoring said receiver during said backoff period to determine whether said receiver has again become busy; and when said receiver becomes busy during said backoff period, terminating said backoff period and waiting for said receiver to again become idle.

21. The article of claim 18, wherein:

transmitting data within one or more free channels after said backoff period expires includes:

identifying whether any additional channels have become free during said backoff period and have remained free for more than a threshold amount of time; and when additional channels have become free during said backoff period and have remained free for more than a threshold amount of time, selecting one or more free channels for use in transmitting said data from a group of free channels that includes said additional channels.

22. A wireless system comprising:

at least one dipole antenna;

a multi-channel wireless receiver;

a multi-channel wireless transmitter coupled to said at least one dipole antenna; and a controller to control channel access to a wireless network medium, wherein said controller, when data is to be transmitted, first waits for said multi-channel wireless receiver to be idle, then waits for at least one channel within a plurality of frequency channels to become free, then initiates a backoff period, then monitors said plurality of active frequency channels during said backoff period to determine whether any other channels have become free during said backoff period, then records a time value when another channel within said plurality of active frequency channels becomes free during said backoff period, said time value for subsequent use in determining whether channel teaming can be used, and then causes said data to be transmitted by the multi-channel wireless transmitter within one or more free channels after the end of the backoff period, wherein said controller is to determine whether to transmit said data within multiple free frequency channels in a channel teaming arrangement when more than one free channel is available when said backoff period expires, wherein said channel teaming arrangement is an arrangement where data is communicated using multiple frequency channels to achieve a higher data rate link than can be achieved using a single frequency channel.

23. The wireless system of claim 22, wherein:

said multi-channel wireless receiver is also coupled to said at least one dipole antenna.

24. The wireless system of claim 22, wherein:

said controller selects said one or more free channels for use in transmitting said data from a group that includes channels that became free during said backoff period and that remained free for at least a threshold amount of time.

25. The wireless system of claim 22, wherein:

said controller selects a maximum number of free channels for use in transmitting said data after the end of the backoff period, wherein said maximum number of free channels can be greater than one.

26. The wireless system of claim 22, wherein:

said wireless system is a wireless client device for use in a wireless network.

27. The wireless system of claim 22, wherein:

said wireless system is a wireless access point for use in a wireless network.

* * * * *